United States Patent [19]
Duquette

[11] 3,924,786
[45] Dec. 9, 1975

[54] PHOTOGRAPHIC LENS SAFETY RING

[76] Inventor: Richard W. Duquette, 21 Rosewood Ave., Cranston, R.I. 02905

[22] Filed: Feb. 14, 1974

[21] Appl. No.: 442,440

[52] U.S. Cl. .................................. 224/5 V; 24/3 R
[51] Int. Cl.² .................................................. A45F 5/02
[58] Field of Search ............ 224/5 V, 5 R, 5 A, 5 B, 224/26 R, 25 R, 26 B; 354/195; 24/3 M, 3 F, 3 R; 403/DIG. 7, 118; 220/38.5, 39

[56] References Cited
UNITED STATES PATENTS
| | | | |
|---|---|---|---|
| 715,399 | 12/1902 | Low | 220/38.5 |
| 2,357,327 | 9/1944 | Harris et al. | 354/195 |
| 3,828,991 | 8/1974 | Moore | 224/5 V |

FOREIGN PATENTS OR APPLICATIONS
| | | | |
|---|---|---|---|
| 34,926 | 5/1922 | Norway | 220/375 |

Primary Examiner—Robert J. Spar
Assistant Examiner—Jerold M. Forsberg
Attorney, Agent, or Firm—Barlow & Barlow

[57] ABSTRACT

A photographic lens safety ring is constructed in the form of a cylindrical member which has a male thread on one end thereof and a female thread on the other end, one thread being adapted to be screwed into the filter mount threads on the front of a lens and the other thread being adapted to receive an accessory such as filters, lens hoods and the like. The member is provided with a securing means on the periphery thereof that is free to rotate about the cylindrical member and a lanyard, tether line, or other device may be attached to this securing means in such a way that it can be retained on a person's clothing or the like.

2 Claims, 5 Drawing Figures

PHOTOGRAPHIC LENS SAFETY RING

BACKGROUND OF THE INVENTION

In photography today it is quite customary for a photographer to carry more than one lens when he goes out on a shooting assignment. This means that oftentimes on location he will be obliged to change from a lens of one focal length to a different lens. When this is accomplished, the lens is either unscrewed or otherwise detached from the body of the camera and then placed within a camera bag or one's pocket. The second lens is then grasped and inserted into the camera body. During this operation there are times when proper receptacles for the lenses are not readily available and it becomes a problem where the photographer must sometimes handle more than one item at a time. There is also during the changeover of lenses the danger of dropping one of the lenses. It is therefore an object of the present invention to provide a device which may be readily attached to existing lenses in the screw mount thereof which normally accepts filters and the like and provide a tether for the device so that the lens will be prevented from dropping to the ground and be damaged.

SUMMARY OF THE INVENTION

The present invention provides an improvement for a photographic lens of a safety ring comprising a cylindrical member having male and female threads that may be readily located within the end of a lens and which will have an attaching means around the periphery thereof to which a tether line may be attached. This attaching means may be in the form of a ring which rotates about the outer wall of the safety ring or other alternate forms so that the attaching means is revolvable to avoid snagging of the tether line attached thereto.

DESCRIPTION OF THE PREFERRED EMBODIMENT

Figure 1:
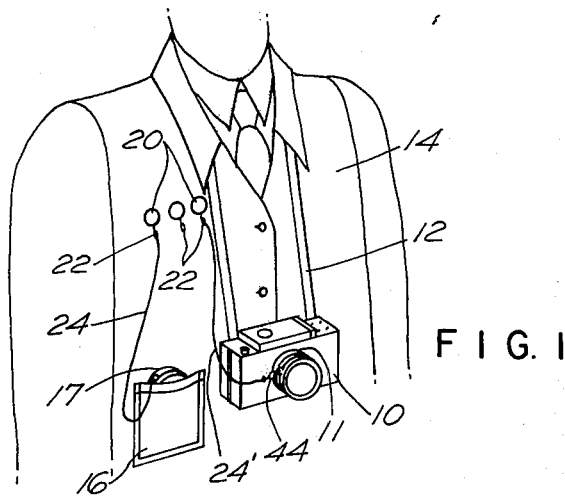
FIG. 1 is a perspective view of a person with a camera with devices of the invention in use.
Figure 2:
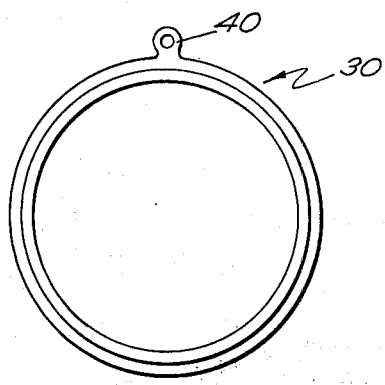
FIG. 2 is a plan view of one of the devices of the invention.
Figure 3:
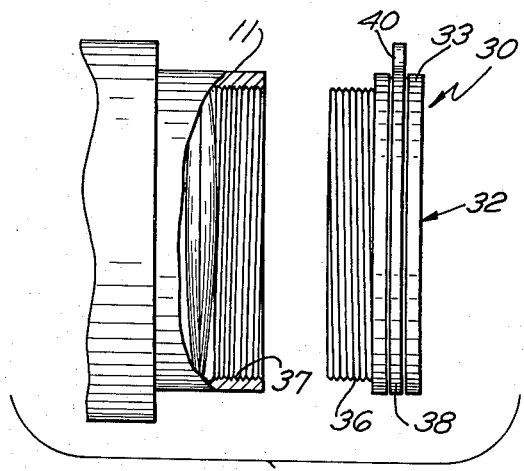
FIG. 3 is a detached elevational view partly in section of the device and a lens.
Figure 4:
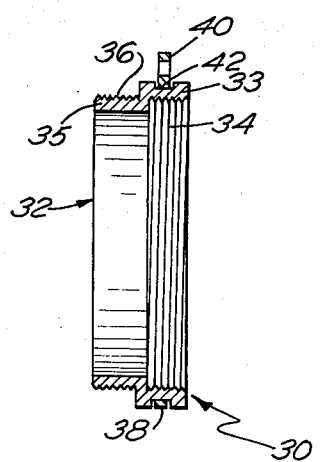
FIG. 4 is a sectional view of a form of the device of the invention.

Referring to the drawings and in particular to FIG. 1, I have shown an individual with a camera 10 having the usual neckstrap 12 slung around the neck of the wearer and depending from the frontal portion of his body. The individual is wearing a vest 14 which has at least one pocket 16 sewed thereto for the reception of an auxiliary lens 17. On the vest in the upper chest portion thereof there has been affixed ring members 20 which have small hooks 22 affixed thereto and to the hooks 22 a tether line such as 24 depends toward the auxiliary lens 17 and a tether line 24' depends towards the lens 11 of the camera 10.

With specific reference now to FIGS. 2 to 5, the safety ring illustrated is adapted to be affixed to lenses. The safety ring which is generally designated 30 comprises a cylindrical member 32 of a stepped formation have a wall of two diameters. The larger diameter outer wall portion 33 has internal threads 34 and the smaller diameter inner wall portion 35 has external threads 36. These threads are of the same mating size of pitch and diameter, such that the threads 36 are considered to be male threads that would be received within the female threads 34. Additionally, the thread size is chosen to fit standard thread mount lenses which lenses are today manufactured with a series of set diameters and thread pitches so that they are interchangeable amongst manufacturers and limit the amount of size changes from one manufacturer to the next. To this end, each lens that is utilized in the industry today is provided as is lens 11 with internal threads such as threads 37 (FIG. 3) and the male threads 36 of safety ring 30 are adapted to threadingly engage the threads 37 of the lens. In like fashion with the safety ring engaged the female threads 34 of the safety ring are available for use to attach such accessory items as sunshades, filters, and other front mounting devices that are in normal use for photography.

The exterior surface or outer wall of the cylindrical safety ring 30 is fitted with a band 38 which band has an anchor member or small ring 40 affixed thereto. The ring 38 is fitted within a groove 42 in the outer surface of the outer wall portion 33 of the ring member in a slidable engagement so that the band may rotate thereabout. To this anchor member 40, a tether line 24 may be affixed by a usual snap ring 44 (see FIG. 1), the other end of the tether line being anchored preferably to the body of the wearer or some other fixed point.

Figure 5:
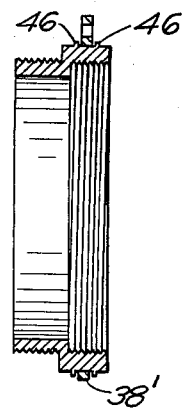
FIG. 5 is a partial sectional view of a modified form of the invention.

Referring to FIG. 5 an alternate means of constructing the safety ring 32 has been illustrated and in this form the band 38' is retained on the outer wall of the ring by a plurality of projections 46 which embrace the edges of the band 38 and permit sliding movement of the band about the outer wall as in the previous embodiment.

It will be seen that in use of the safety ring that the same may be readily screwed into the frontal out portion of a lens and the tether lines will be secured to the clothing of the person utilizing the camera or some other suitable detachment point. When it is desired to change lenses, the lens may be suitably detached from the camera body and the lens in this case is prevented from falling to the ground and is retained by the tether lines 24.

I claim:

1. A photographic lens safety ring for interchangeable lenses having a female threaded section adjacent the objective thereof comprising a cylindrical member having an outer wall of stepped formation defining two diameter portions and an inner wall having two diameters, a band having an anchor means thereon, said band being received about the larger diameter portion of said outer wall, groove means defined on said portion for retaining the band on said outer wall portion for rotation thereabout in slidable relation therewith, a tether line attached to said anchor means and having its other end provided with means to attach to the body of the camera user, said outer wall having a threaded surface extending inwardly from the one edge of said member on the smaller diameter portion, the inner wall of said cylindrical member having a threaded surface extending inwardly from the other edge of the member in the larger diameter, said threaded surfaces being of the same mating size of pitch and diameter, whereby an accessory normally received in the threaded section of the lens of a camera is selectively received in the inner threaded portion of the safety ring while the outer threaded portion may inturn be received in the threaded section of the camera lens.

2. A photographic lens safety ring as in claim 1 wherein said groove means is defined by protrusions extending from said outer wall, said protrusions being aligned in two spaced parallel planes, said band being received between said protrusions in slidable engagement around said outer wall.

* * * * *